United States Patent [19]
Van Huis

[11] 3,965,691
[45] June 29, 1976

[54] COOLING SYSTEM FOR POULTRY HOUSES

[75] Inventor: Robert L. Van Huis, Zeeland, Mich.

[73] Assignee: U.S. Industries, Inc., New York, N.Y.

[22] Filed: May 28, 1974

[21] Appl. No.: 473,789

[52] U.S. Cl. .................... 62/157; 62/171; 98/30; 261/98; 261/105; 261/106; 261/DIG. 34
[51] Int. Cl.² ............................. F28D 5/00
[58] Field of Search .................. 98/30, 17, 37; 236/44 B; 119/16; 261/105, 106, 100, 98, 92, DIG. 34; 62/91, 121, 157, 171

[56] References Cited
UNITED STATES PATENTS

| | | | |
|---|---|---|---|
| 2,620,722 | 12/1952 | Owens | 261/106 X |
| 2,718,187 | 9/1955 | Frisby | 98/37 |
| 3,363,531 | 1/1968 | Kohlmeyer et al. | 98/30 |
| 3,689,037 | 9/1972 | Payne | 261/105 |
| 3,787,036 | 1/1974 | Hastings | 261/106 X |
| 3,808,960 | 5/1974 | Van Huis | 98/41 R |
| 3,855,371 | 12/1974 | Morrow et al. | 261/100 |

*Primary Examiner*—William E. Wayner
*Assistant Examiner*—William E. Tapolcai, Jr.
*Attorney, Agent, or Firm*—Price, Heneveld, Huizenga & Cooper

[57] ABSTRACT

When the ambient temperature is high, proper temperature control is assisted within the poultry house using a spray means that sprays water onto a filter pad that is positioned in front of the fresh air inlet. The water spray and pad act to cool air being taken into the building through the inlet without objectionably raising the humidity.

11 Claims, 3 Drawing Figures

COOLING SYSTEM FOR POULTRY HOUSES

BACKGROUND OF THE INVENTION

The present invention relates to temperature control means for poultry houses and in particular, to such control means that use a cooling spray.

A marked improvement in the production and growth rate of confined poultry or other livestock is noted if the confinement houses are regularly and evenly ventilated and the temperatures are kept moderate and in control. As a result, the idea of cooling and ventilating such houses is well known, but has not been heretofore totally successful.

One prior art method of cooling used is a water spray dispersed in front of the air intake vent. This method, however, is disadvantageous in that excessive amounts of water are released into the inlet raising the relative humidity which is objectionable in view of the ever present poultry dung. Further, distribution of water throughout the air being fed into the inlet is uneven.

Another prior art method uses a pad which is placed in front of the air inlet. Water is then dripped or dispersed through a pipe onto the pad from above soaking the pad for cooling. Unfortunately, water run-off was experienced which proved wasteful and objectionable. Also, the same elevated humidity was experienced. This method is also disadvantageous in that preferred courses of travel for the water developed throughout the pad. Thus, water distribution through the pad and resultant cooling was uneven. Thus, there is a need in this art for an improved apparatus and method for cooling ventilation air in a poultry house.

SUMMARY OF THE INVENTION

In accordance with the present invention, an improved cooling system for poultry houses provides a low cost and efficient method of cooling ventilation air in poultry houses. The cooling system includes a spray means and a filter pad positioned in front of an air intake vent of a building. The pad has an internal face facing the inlet and an external face upon which coolant is sprayed by the spray means.

The pad and spray means are positioned so that air being drawn into the intake vent passes through the spray and the pad prevents excess coolant from being carried into the poultry house.

As air is drawn through the spray and over the pad, a cooling effect takes place in the air causing cooling of the building as air is being drawn therein.

An automatic control system may be utilized in the present invention to initiate intermittent dispersement of the coolant onto the pad by the spray means.

DESCRIPTION OF THE PREFERRED EMBODIMENT

Figure 1:
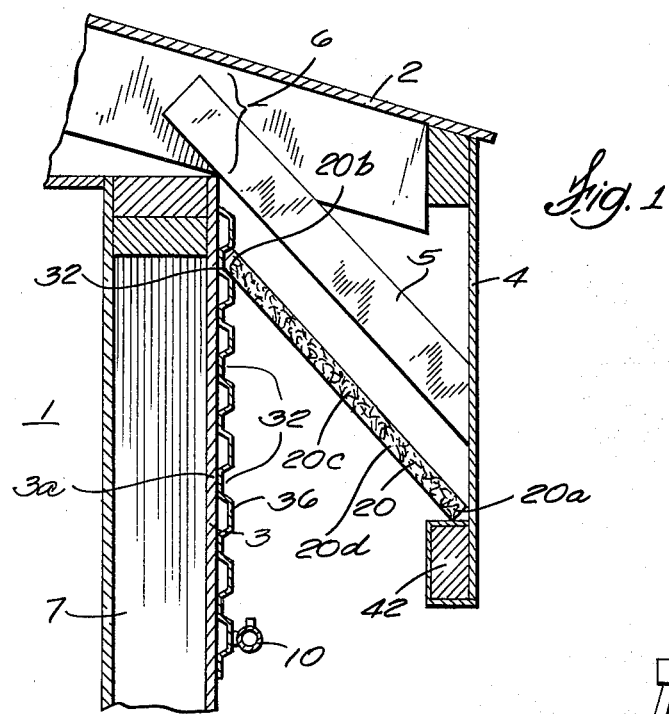
FIG. 1 is a fragmentary elevational view in cross section of a poultry house using the invention.

Referring to the drawings, the cooling system for buildings utilizes a pad 20 that is positioned in front of vent 6 of a poultry building 1. Adjacent pad 20 and in the path of fresh air entering the building 1, a sprayer system 10 is positioned to distribute a fine mist or fog of coolant, e.g., water, into the air as the air is taken into building 1. Pad 20 acts to capture the cooling mist and promotes even distribution of coolant throughout the air as the air is drawn through pad 20.

More specifically and referring to FIG. 1, the building 1 with which the cooling system of the present invention is being used, consists of a roof 2, a corrugated side wall 3, a downward roof extension 4, a rigid support member 5 for extension 4, and an intake vent area 6. Various elements of building 1 are appropriately insulated, such as wall 3, with insulation 7. The various elements of the building 1 are comprised of conventional materials. For example, roof extension 4 is comprised of exterior plywood with metal siding, while side wall 3 is comprised of insulated wall board 3a with a corrugated metallic exterior 3b. Although not shown, the building will generally utilize an exhaust means to provide ventilation. The exhaust means causes flow of air through the air intake.

Pad 20 is comprised of a filter type or porous material capable of receiving coolant sprayed thereon and also permitting air flow therethrough. Typical useful materials include excelsior, plasticized foam, etc. As shown, pad 20 is excelsior supported in a generally rectangular-shaped metallic frame having a lower margin 20a and upper margin 20b. The thickness of the pad presents an interior face 20c and exterior face 20d with relation to the intake vent area 6.

Pad 20 is mounted onto building 1 by resting the bottom margin 20a against support block 42 of extension 4 and by securing or resting upper margin 20b between one of the notches 3a of the corrugated side wall 3. Pad 20 is preferably inclined as shown so that any excess coolant which is sprayed on pad 20 will run off the lower margin 20a away from side wall 3 as opposed to running into side wall 3.

Pad 20 is also positioned so that all air entering building 1 through intake 6 must pass therethrough. Preferably, in accordance with preferred aspects of ventilation techniques, intake vent area 6 extends longitudinally the length of the building. In such cases, pad 6 also extends the entire length of the building as does the spray means 10 described hereinafter.

Figure 2:
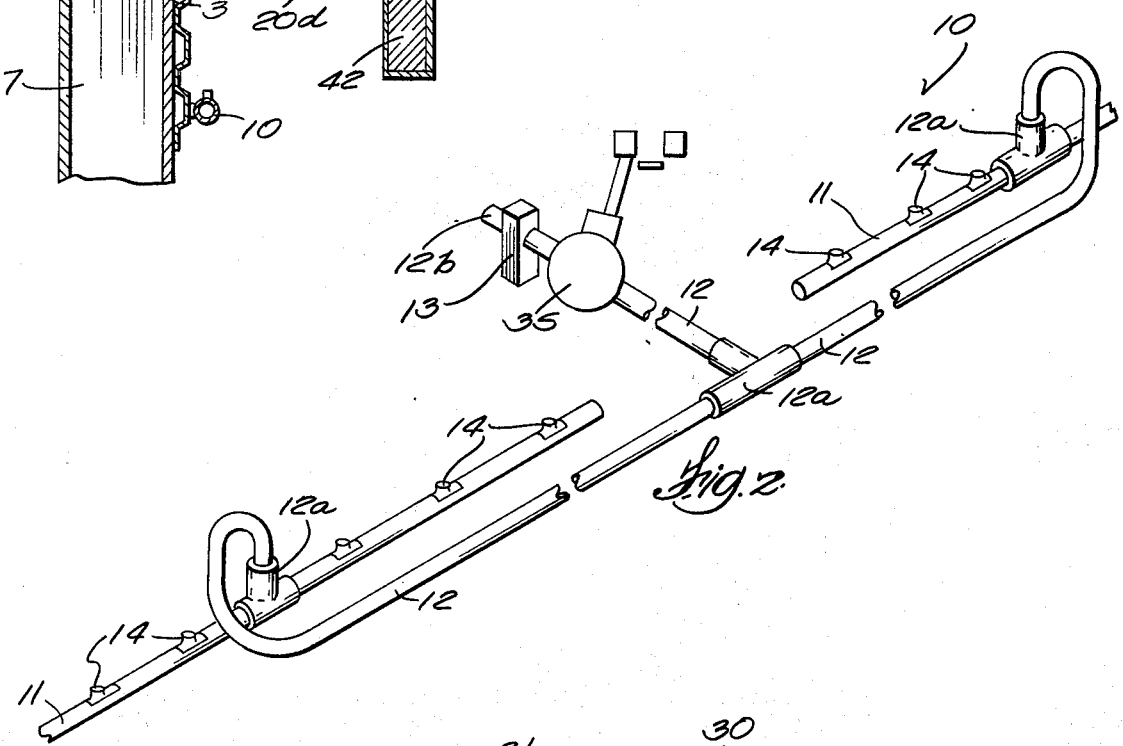
FIG. 2 is a schematic partial perspective view of the spray means provided by the invention.

Spray means 10, as shown in FIG. 2, is of conventional structure elements and consists of fogger pipes 11 which are in communication with a source of liquid coolant, such as water, through pipe lines 12 and appropriate T-connections 12a. A line filter 13 is preferably provided at the intake end 12b of line 12. A plurality of nozzles 14 are positioned along the length of pipes 11 and are commonly directed generally upward and preferably develop a fine fog-like spray. In the embodiment shown, pipes 11, line 12, "T's" 12a, and nozzles 14 are all preferably comprised of three-fourth inches PVC tubing.

Spray means 10 is mounted on building 1 by attachment of pipes 11 to side wall 3, as shown in FIG. 1. Other elements of means 10 are also suitably mounted in building 1 (not shown). Pipes 11 and nozzles 14 are positioned below pad 20 so that the spray is directed onto the exterior surface 20d and the air moving into vent 6 will be thoroughly wetted. As is apparent from FIG. 1, nozzles 14 are generally directed to spray coolant into a closure formed by pad 20, roof extension 4, and side wall 3.

Figure 3:
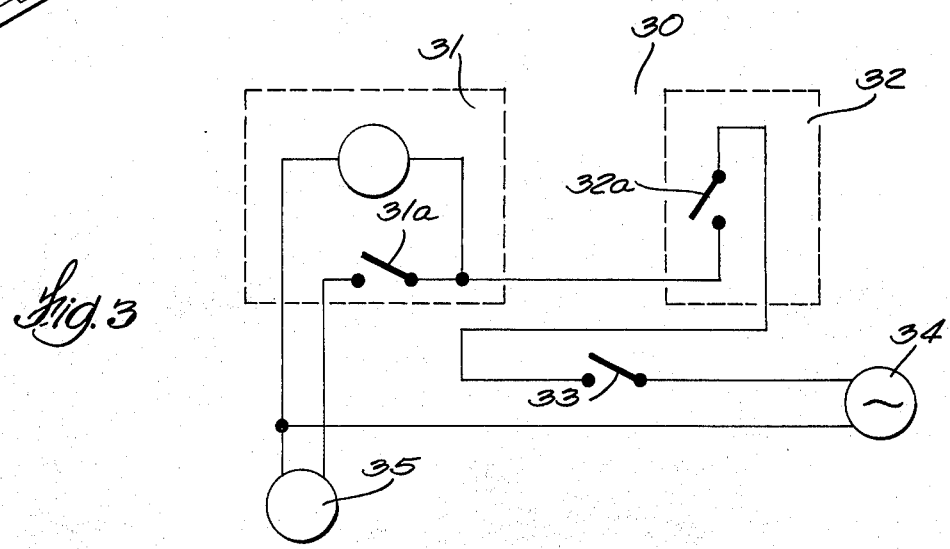
FIG. 3 is a schematic view of an automatic control means used in conjunction with the invention.

In the embodiment shown, an automatic control means 30 as shown in FIG. 3 is utilized in conjunction with the spray means 10 to provide a fully automated cooling means. Control means 30 consists of a timer 31 operably connected to a thermostat 32, main switch 33. These are all operably connected to a solenoid 35 powered by electrical source 34. Timer 31 and thermostat 32 both respectively include internal switches 31a and 32a. The automatic control means 30 provides several advantages. The solenoid controls actuation and can be temperature responsive. It can also be strictly time responsive or a combination of either. Intermittent time actuation is desired in controlling liquid run-off which can essentially be eliminated. Intermittent soaking keeps the pad and resultant airflow cooled without run-off.

OPERATION

Having described the apparatus, its operation should be obvious. Assuming it is desired to maintain the temperature of building 1 at 72° F. (or any other moderate temperature), thermostat 32 is set at 72° F. and main switch 33 is closed. Timer 32 may be set to allow the system to run at selected intervals so that excess run-off from pads 20 does not occur.

When the temperature of building 1 exceeds 72° F., switch 31a closes causing operation of solenoid valve 35 and a mist of coolant is sprayed into pad 20 by spray means 10 in a manner as above described. The timer 32 through switch 32a, however, actuates solenoid 35 in cooperation with the thermostat. As the temperature of building 1 falls below 72° F., thermostat 31 opens switch 31a causing solenoid valve 35 to close whereby spraying is discontinued.

The wetted pad 20 still continues to cool building 1 thereafter until all the coolant is removed therefrom.

It will be understood that various changes in the details, materials, steps, and arrangements of parts which have been herein described and illustrated in order to explain the nature of the invention, may be made by those skilled in the art within the principle and the scope of the invention as expressed in the appended claims.

The embodiments of the invention in which an exclusive property or privilege is claimed are defined as follows:

1. Apparatus for cooling the interior of a poultry house having an air inlet comprising, in combination:
at least one filter pad positioned in front of the air inlet, said pad having an internal face facing said inlet and an external face; and
spray means including a pressurized source of coolant for spraying liquid coolant over said external face, said spray means positioned upstream of all said filter pads and directing said liquid coolant in the direction of flow through said air inlet whereby the air drawn through said pad is cooled;
automatic control means to initiate intermittent dispersement of the coolant onto said filter pad by said spray means, said automatic control means including temperature sensing means, timer means responsive to said temperature sensing means, valve means acting to control flow from said source and being operably connected to said timer means, said sensing means initiating operation of said timer means at a predetermined temperature and said timer acting to intermittently open and close said valve means to effect intermittent spraying of coolant by said spray means so as to reduce run-off from said pad.

2. The apparatus of claim 1 wherein said spray means comprises spray nozzles, said spray nozzles acting to disperse the coolant as a fine mist upon said filter pad, and positioned on the exterior of said poultry house.

3. The apparatus of claim 1 wherein said pad is comprised of a foam-like material capable of evenly distributing therein coolant sprayed thereon.

4. In combination with a livestock housing building including a side wall, a roof portion, and a downward extension from said roof portion in spaced relation from said side wall and an air inlet, said air inlet being positioned in said side wall and above the downwardmost end portion of said roof extension; at least one filter pad positioned in front of said air inlet, said pad having an internal face facing said inlet and an exterior face, said pad being secured between said side wall and said downward extension; and spray means attached to said side wall at a position below said pad means for spraying a liquid coolant over said external face upstream of said filter pad whereby the air drawn through said pad is cooled.

5. The apparatus of claim 4 wherein said spray means comprises spray nozzles located on the exterior of said building, said spray nozzles acting to disperse the coolant as a fine mist upon said filter pad.

6. The apparatus of claim 4 wherein said pad is comprised of a foam-like material capable of evenly distributing thereon coolant sprayed thereon.

7. The combination of claim 4 wherein said air inlet extends longitudinally the length of said building and said pad and spray means extend correspondingly along said air intake.

8. The combination of claim 4 wherein said mist is directed by said spray means into a closure formed by said pad, said side wall, and said roof extension.

9. The combination of claim 4 wherein the lower margin of said pad is secured against said roof extension so that excess coolant running off from said pad will be directed away from said building.

10. The apparatus of claim 4 wherein said combination further includes an automatic control system to initiate intermittent dispersement of the coolant onto said filter pad by said spray means.

11. The apparatus of claim 10 wherein said spray means includes a pressurized source of coolant and said automatic control system includes a temperature sensing means, a timer means responsive to said temperature sensing means, a valve means acting to control flow from said source and being operably connected to said timer means, said sensing means initiating operation of said timer means at a predetermined temperature and said timer acting to intermittently open and close said valve means to effect intermittent spraying of coolant by said spray means so as to reduce run-off from said pad.

* * * * *